(No Model.)
S. J. ADAMS.
PIPE BALL.
No. 433,585. Patented Aug. 5, 1890.
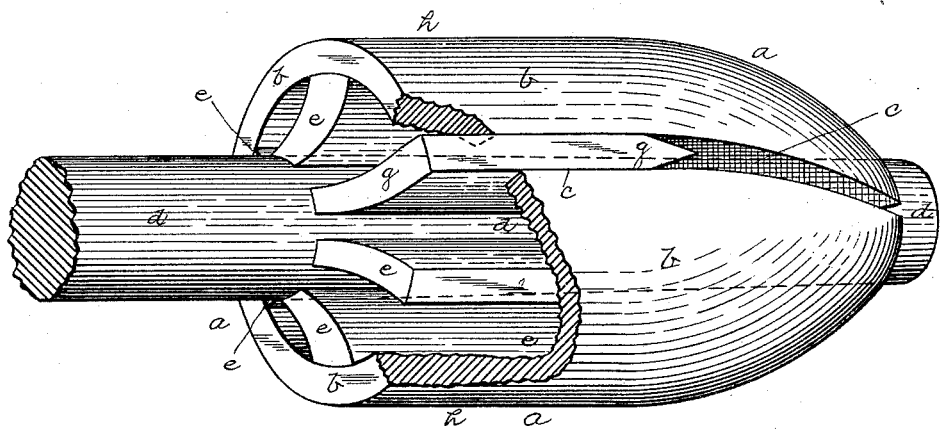
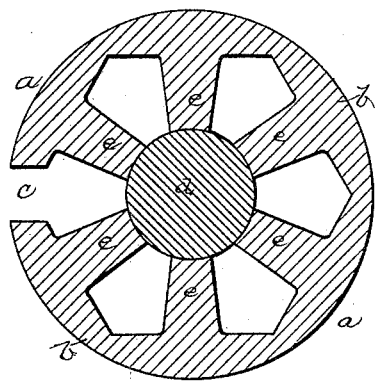 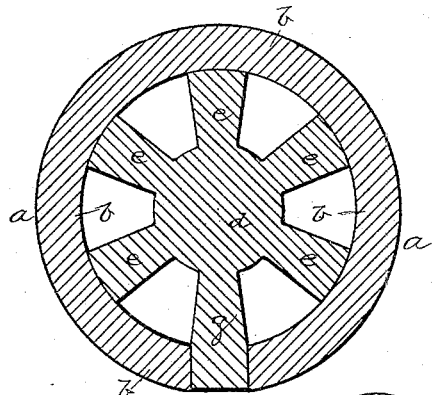
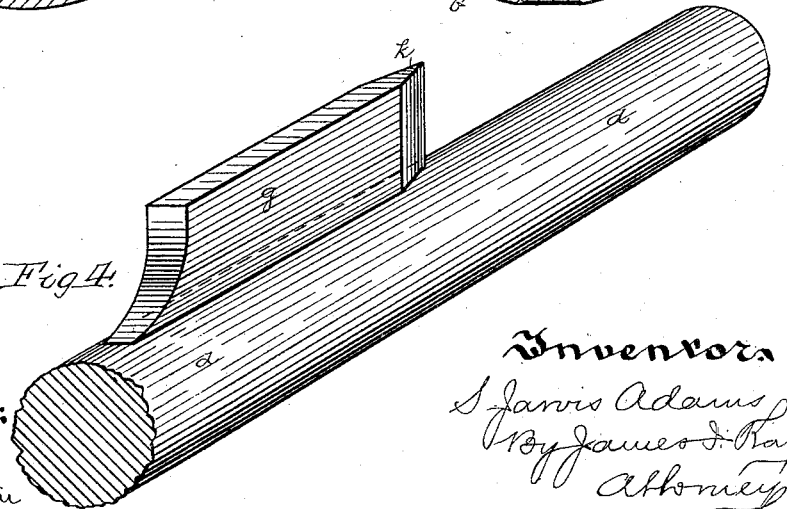
Witnesses:
J. N. Cook
Robt. D. Totten
Inventor
S. Jarvis Adams
By James I. Kay
Attorney

UNITED STATES PATENT OFFICE.

STEPHEN JARVIS ADAMS, OF PITTSBURG, PENNSYLVANIA.

PIPE-BALL.

SPECIFICATION forming part of Letters Patent No. 433,585, dated August 5, 1890.

Application filed September 30, 1889. Serial No. 325,609. (No model.)

*To all whom it may concern:*

Be it known that I, STEPHEN JARVIS ADAMS, a resident of Pittsburg, in the county of Allegheny and State of Pennsylvania, have invented a new and useful Improvement in Pipe-Balls; and I do hereby declare the following to be a full, clear, and exact description thereof.

My invention relates to tube-welding balls. These balls are generally formed of cast metal and are necessarily required to sustain heavy pressure in the welding of the tube thereon, while in forming different thicknesses and sizes of pipe it is necessary that the ball shall be accurately cast in shape, the variation of one-fiftieth part of an inch in the diameter of the ball being considered fatal. It is also extremely desirable to provide a ball which, in case of the formation of a "sticker," can be easily crushed and withdrawn from the tube, thus overcoming the necessity of cutting the tube at the point where the ball is stuck within the same, and so preventing the necessity of forming short lengths of pipe or tubing. It is also necessary in the formation of these balls to provide a sufficient body of metal at the point of weld to prevent the rapid heating up of the ball, and consequently the rapid cutting or wearing thereof by the heated metal upon the ball during the process.

The object of my invention is to provide a ball meeting these requirements; and it consists, generally stated, in a tube-welding ball having a longitudinally-extending slot in its peripheral wall, so leaving the ball when unsupported weak and breakable—that is, providing by the slot for the easy crushing of the ball—combining therewith a support fitting tightly within the ball, so as to prevent the springing or yielding thereof during the welding operation, such construction of the ball enabling me to provide the necessary body of metal for properly sustaining the ball, so as to keep it rigid and firm and prevent the rapid heating thereof during the welding operation, but by means of this slot in the body of the ball providing for the easy breaking of the ball as soon as the support is removed.

It also consists in certain other improvements, as will be hereinafter set forth and claimed.

To enable others skilled in the art to make and use my invention, I will describe the same more fully, referring to the accompanying drawings, in which—

Figure 1 is a perspective view, partly broken away, and showing my invention. Fig. 2 is a cross-section thereof. Fig. 3 is a cross-section illustrating another form of my invention, and Fig. 4 is a perspective view of a mandrel suitable for use in connection with the same.

Like letters of reference indicate like parts in each.

My invention may be employed in the different forms of tube-welding balls, either the shell ball or ball having a series of separate lugs bearing upon the mandrel, or other suitable form of ball. It is illustrated particularly in connection with the shell balls—*i. e.*, the ball having a shell without braces, lugs, or supporting means depending from that shell, such shell being shown in Figs. 1 and 2.

The shell $b$ of the ball $a$ can be made of the required thickness, having either a true cylindrical or angular interior, as may be found desirable, and having the longitudinally-extending slot $c$ in its peripheral wall or in the shell of the ball. For supporting this shell I prefer to employ a mandrel or bar $d$, having a series of wings $e$ thereon, these wings fitting within the interior of the shell, as fully shown in the drawings, and the wings thus providing a light head to the bar $d$, which will give the necessary support to the ball and hold it rigid during the welding process. In the general construction of such balls I find it preferable to form the point of the ball with the shell or body $b$, and having the winged mandrel fitting within such shell, as shown; but the winged mandrel may extend entirely through the ball and form a nose or tapering end thereon. In order to further insure the proper supporting of the shell, body, or peripheral wall of the ball, I have arranged for one of the wings—such as the wing $g$—to extend within the slot $c$ and fill said slot, and so prevent any pressure on the body of the ball acting to contract or spring the ball. This wing $g$ may in fact fit within the slot in such way as to give all necessary support to the peripheral wall, so overcoming the necessity of the mandrel fitting so tightly within the ball as to give such support thereto. The wing may also even up the outer surface of the ball, if it is so desired. The support to the peripheral wall of the ball is generally only at or near the welding-point of the ball—such, for example, as at the point $h$ in Fig. 1—and it is necessary only that the supporting wing or wings shall be placed at this point longitudinally of the ball.

In Fig. 3 is shown another form embodying my invention and well suited for practical use. The same consists of the shell or peripheral wall $b$, having the wings $e$ integral with and depending from the peripheral wall and fitting around the mandrel $d$, which, by fitting within the wings or lugs $e$, gives the necessary support to the ball at the point of weld. In said ball the slot $c$ is shown as open, no wing or filling piece extending therein; but, if desired, the supporting-mandrel $d$ may have formed thereon the wing $g$, as shown in Fig. 4, this wing $g$ fitting in the slot $c$ and imparting the necessary rigidity to the body of the ball. Where the wing or lug is to fit within the slot $c$ the forward end of the wing is formed tapering or pointed, as at $k$, Fig. 4, so as to provide for the easy entrance of the wing within the slot.

When my invention is in use, the body or shell of the ball is placed upon the mandrel or supporting-rod $d$, so as to be properly and firmly supported either by the mandrel fitting within the shell, the wings on the mandrel, the wings in the shell, or the wing entering within the slot of the ball. During the welding operation the ball is held rigidly by one or other supporting means, and as there is no opportunity for any spring in the body of the ball it forms a practically perfect anvil on which the tube can be welded. In case, however, the ball should stick within the tube during the welding operation, either on account of irregularities in the thickness of the metal, irregularity in the body of the ball or rolls, or from other such causes, as soon as the mandrel is withdrawn from the ball and the tube having the ball therein is removed from the welding apparatus, it is evident that the shell $a$ of the ball is left unsupported, and at the same time that it has a longitudinally-extending slot in the same, so breaking the continuity of the shell and rendering it easy to crush or break the shell. When, therefore, either by hammer or drop a heavy blow is struck upon the shell, it is evident that it will be easily broken without injuring the body of the tube, and that the partially-welded tube can be again inserted in the furnace and welded to shape. At the same time I am enabled to employ such a thickness of metal in the body of the ball as is necessary to prevent its rapid heating in the welding operation and prevent the rapid cutting of the ball.

What I claim as my invention, and desire to secure by Letters Patent, is—

1. A tube-welding ball having a longitudinally-extending slot in its peripheral wall, in combination with a supporting-mandrel fitting within the ball and having a wing or lug thereon fitting within the slot of the ball and holding the ball rigid during the welding operation, substantially as and for the purposes set forth.

2. A tube-welding ball having a longitudinally-extending slot in its peripheral wall, in combination with a supporting-mandrel fitting within the ball and having a wing or lug thereon fitting within the slot of the ball, said wing having a tapering or pointed forward end, substantially as and for the purposes set forth.

3. In a tube-welding ball, the combination of an outer shell having a longitudinally-extending slot in its peripheral wall, and a mandrel having a series of wings thereon bearing against the inner wall of this shell, and a wing or lug fitting within the slot in the shell, substantially as and for the purposes set forth.

In testimony whereof I, the said S. JARVIS ADAMS, have hereunto set my hand.

STEPHEN JARVIS ADAMS.

Witnesses:
JAMES I. KAY,
J. N. COOKE.